United States Patent
Muhammad

(10) Patent No.: US 9,008,157 B2
(45) Date of Patent: Apr. 14, 2015

(54) SYSTEM AND METHOD FOR CONTROLLING ABERRANT TRANSCEIVER OPERATION

(75) Inventor: Khurram Muhammad, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1993 days.

(21) Appl. No.: 12/118,804

(22) Filed: May 12, 2008

(65) Prior Publication Data
US 2009/0279594 A1 Nov. 12, 2009

(51) Int. Cl.
  *H04B 1/40* (2006.01)
  *G06F 9/48* (2006.01)
(52) U.S. Cl.
  CPC .................................... *G06F 9/4812* (2013.01)
(58) Field of Classification Search
  USPC ......................................... 375/219, 220, 221
  See application file for complete search history.

(56) References Cited

U.S. PATENT DOCUMENTS

2002/0176390 A1* 11/2002 Sparr et al. .................... 370/338

OTHER PUBLICATIONS

Staszewski, et al. "All-Digital PLL and Transmitter for Mobile Phones" IEEE Journal of Solid State Circuits, vol. 40, Issue 12, pp. 2469-2482, Dec. 2005.

* cited by examiner

*Primary Examiner* — Michael Neff
(74) *Attorney, Agent, or Firm* — Ronald O. Neerings; Frank D. Cimino

(57) ABSTRACT

A transceiver and a method of controlling aberrant transceiver operation. In one embodiment, the transceiver includes: (1) a processor, (2) an interrupt system coupled to the processor and having a flag register associated therewith, (3) detection circuits associated with corresponding functional units of the transceiver and configured to detect conditions regarding the corresponding functional units and set corresponding flags in the flag register, the interrupt system configured to assert interrupts in response thereto and (4) an interrupt-handing routine executable in the processor and configured to respond to the interrupts by carrying out at least one of loading parameters and generating warnings based on identities of the flags.

20 Claims, 7 Drawing Sheets

SYSTEM AND METHOD FOR CONTROLLING ABERRANT TRANSCEIVER OPERATION

TECHNICAL FIELD OF THE INVENTION

The invention is directed, in general, to radio transceivers and, more specifically, to a system and method for controlling aberrant transceiver operation.

BACKGROUND OF THE INVENTION

Modern radio transceivers, which are made up of dedicated hardware for, e.g., synthesizing, modulating or demodulating, characterizing, encoding or decoding, filtering, mixing and converting signals, are typically controlled in real-time by a processor. However, the processor controls the transceiver hardware only to a limited degree. The processor is initially responsible for loading sets of parameters (e.g., thresholds, constants, coefficients, etc., that establish various quantities, levels, maxima, minima, ranges, rates, rates of change, etc.) into various registers associated with the transceiver hardware to establish its operating characteristics. Once the transceiver hardware has been configured, the processor is thereafter responsible for queuing data that the transceiver is to transmit and further processing data that the receiver has received (e.g., assembling and error-checking packets of data, prompting the retransmission of data that had been previously been corrupted and indicating the receipt of data to downstream elements of a larger system). The transceiver hardware itself is responsible for transmitting and receiving the signals bearing the data; the processor may be properly regarded as ancillary to the transceiver hardware.

This general architecture is prevalent among conventional processor-controlled transceivers and has proven successful in a wide array of applications. However, it is always desirable to enhance the operation of a transceiver. More specifically, it is often desirable to make the transceiver more flexible in terms of the conditions under which it is able to operate. What is needed is a better way to control a transceiver with a processor, particularly when the transceiver hardware is operating aberrantly.

SUMMARY OF THE INVENTION

To address the above-discussed deficiencies of the prior art, one aspect of the invention provides a transceiver that incorporates a system for controlling aberrant operation of the transceiver. In one embodiment, the transceiver includes: (1) a processor, (2) an interrupt system coupled to the processor and having a flag register associated therewith, (3) detection circuits associated with corresponding functional units of the transceiver and configured to detect conditions regarding the corresponding functional units and set corresponding flags in the flag register, the interrupt system configured to assert interrupts in response thereto and (4) an interrupt-handing routine executable in the processor and configured to respond to the interrupts by carrying out at least one of loading parameters and generating warnings based on identities of the flags.

In another embodiment, the transceiver is a digital transceiver. The digital transceiver includes: (1) a reference clock generator, (2) a phase-locked loop coupled to the reference clock generator, (3) a receive chain coupled to the phase-locked loop, (4) a transmit chain coupled to the phase-locked loop, (5) a processor, (6) an interrupt system coupled to the processor and having a flag register associated therewith, (7) detection circuits associated with corresponding functional units of the reference clock generator, the phase-locked loop, the receive chain and the transmit chain and configured to detect conditions regarding the corresponding functional units and set corresponding flags in the flag register, the interrupt system configured to assert interrupts in response thereto and (8) an interrupt-handing routine executable in the processor and configured to respond to the interrupts by carrying out at least one of loading parameters in the corresponding functional units and generating warnings based on identities of the flags.

Another aspect of the invention provides a method of controlling aberrant transceiver operation. In one embodiment, the method includes: (1) detecting a condition regarding a functional unit of the transceiver with a detection circuit, (2) setting a corresponding flag in a flag register with the detection circuit, (3) asserting an interrupt in response to the setting and (4) responding to the interrupts by carrying out at least one of loading parameters and generating warnings based on identities of the flags.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
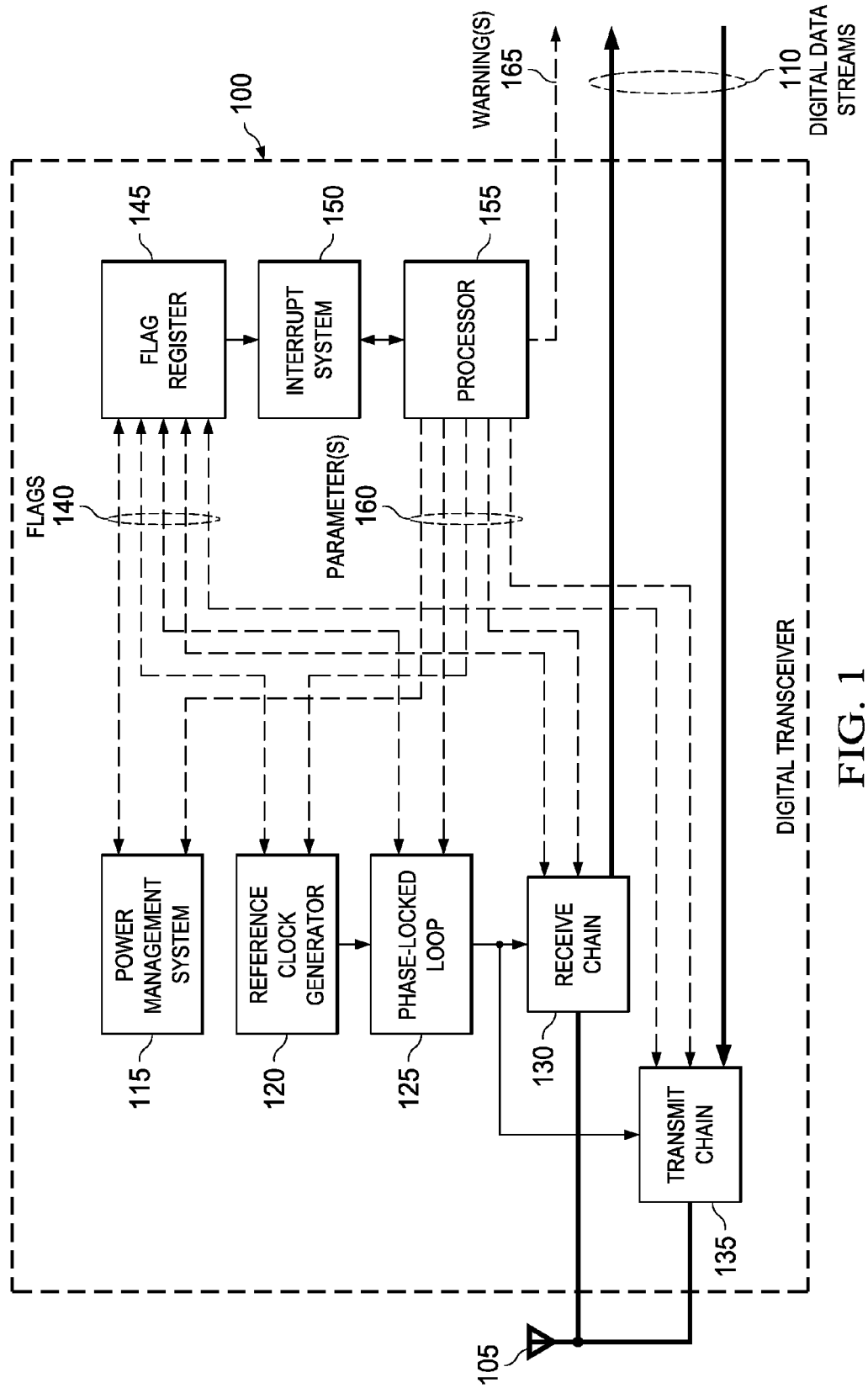
FIG. 1 is a high-level block diagram of one example of a transceiver including a processor and one embodiment of a system for controlling aberrant operation of the transceiver.

As described above, the general architecture in which a processor is ancillary to transceiver hardware is prevalent among conventional processor-controlled transceivers and has proven successful in many applications. However, in general, no provision exists in today's processor-controlled transceivers to react to extraordinary operating conditions, especially those that the transceiver hardware is not equipped to handle and therefore results in aberrant (unpredictable, out-of-specification) transceiver operation.

For example, conventional transceiver hardware cannot accommodate or compensate for a phase-locked loop (PLL) that has unexpectedly fallen out of lock. Similarly, conventional transceiver hardware is unable to operate with controlled degradation in the presence of a blocking signal that is out-of-specification. In both of these cases, the aberrant operation is typically first detected when the processor determines that the data it is receiving from the transceiver hardware is corrupt. However, the processor is unable to determine whether the data was corrupt when it reached the transceiver or became corrupt in its passage through the transceiver.

In an attempt to address the corruption, the processor may assume that the transceiver hardware is operating aberrantly and load different parameters into the transceiver hardware, but this crude approach is highly unlikely to correct the problem and may in fact disrupt a properly functioning transceiver. A more reasonable course of action is for the processor instead to assume that data was corrupt when it reached the transceiver and request retransmission, perhaps repeatedly. Corruption that persists through repeated retransmission more likely indicates aberrant transceiver operation, but then the processor has to identify a specific problem and contend with it. No matter how the processor may set out to address the corruption, significant time is consumed, and significant data is typically lost. Aberrant operation can therefore greatly reduce the overall performance of the transceiver.

The various embodiments described herein are directed to integrating the processor more extensively with the transceiver hardware. Generally speaking, various detector circuits are employed to detect specific conditions in specific functional units in the transceiver hardware that can cause aberrant transceiver operation. For example, a detector circuit that compares phase error to a defined threshold may detect a phase-locked loop (PLL) falling out of lock or frequency pulling. A detector circuit that compares the energy at an offset frequency in a phase error signal to a threshold may detect the presence of an undesired spur at the PLL output. A detector circuit that compares the peak output of a low-noise amplifier (LNA) to a threshold may detect compression of a front-end of a receive chain. A detector circuit that compares analog-to-digital converter (ADC) output to a threshold may detect compression of a back-end of the receive chain.

The detector circuits are capable of initiating interrupts that prompt the processor to respond to those specific conditions. Thus, the processor is given more timely and specific information regarding the source of any aberrant operation, allowing it to respond more quickly and surely to correct the problem. In general, the outputs of various detection circuits are routed to the interrupt system of the controlling processor, allowing the processor to react quickly and in a precise manner to a detected condition.

Before describing various embodiments of transceivers and methods constructed and carried out according to the principles of the invention, one example of a transceiver will be described in some detail. The example is set forth herein for the purpose of showing how interrupts and interrupt handling can be employed to enable a processor to enhance the operation of a transceiver. Those skilled in the pertinent art should understand that the example transceiver merely provides a basis for describing certain embodiments of the invention and in no way limits the scope of the invention.

FIG. 1 is a high-level block diagram of one example of a transceiver 100 including a processor and one embodiment of a system for controlling aberrant operation of the transceiver. The transceiver 100 happens to be a digital transceiver, though it could just as well be an analog transceiver. The digital transceiver is coupled to an antenna 105 and produces and receives streams of digital data (bits) 110. The streams 110 are typically divided into packets, frames or the like, which typically include control and/or error-checking data (not shown). Those skilled in the pertinent art are familiar with various conventional standards for packetizing data and further understand that future standards are likely to be developed for packetizing data in different ways.

The digital transceiver 100 contains a power management system 115. The power management system 115 is configured to provide electric power at specified voltage, current and distortion levels to the digital transceiver 100 to enable its operation. Often, the power management system 115 manages power provided by a battery (not shown). As those skilled in the pertinent art are aware, battery power has electrical characteristics that are a function of the physical characteristics of the battery supplying the power. Those electrical characteristics become more difficult to manage and are more likely to cause aberrant transceiver operation as the battery approaches a total discharge. If the ultimate power source for the digital transceiver 100 is a battery, the power management system 115 is responsible for mitigating variations in those electrical characteristics.

Figure 2:
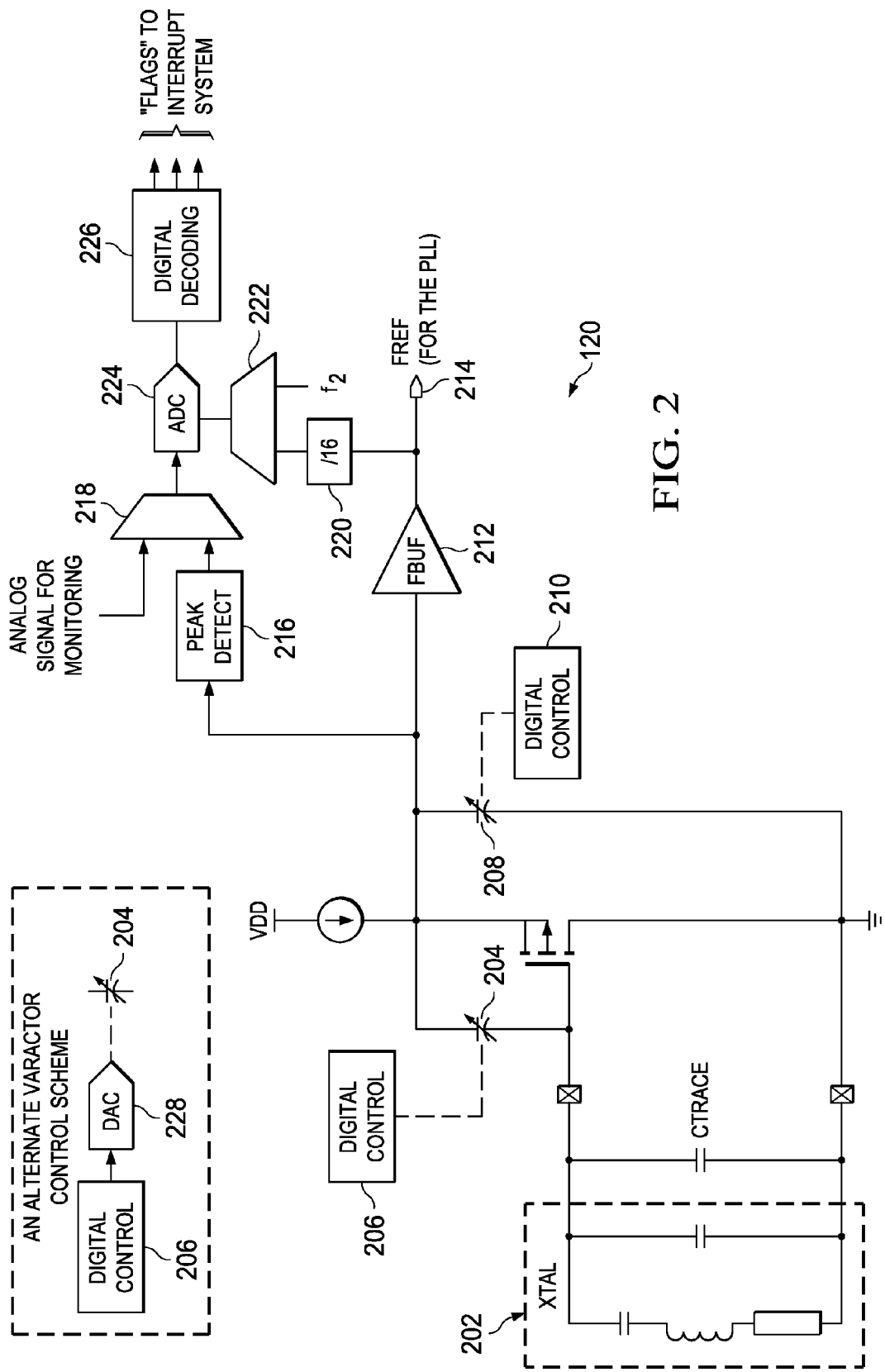
FIG. 2 is a block diagram of one embodiment of a reference clock generator of the transceiver of FIG. 1.

The digital transceiver 100 contains a reference clock generator 120. The reference clock generator 120 is configured to generate a reference clock signal employable to provide a suitable timebase to control transmissions generated by the digital transceiver 100 or to synchronize the digital transceiver 100 to transmissions generated by other digital transceivers in a wireless network (not shown). FIG. 2, below, will illustrate one embodiment of the reference clock generator 120.

Figure 3:
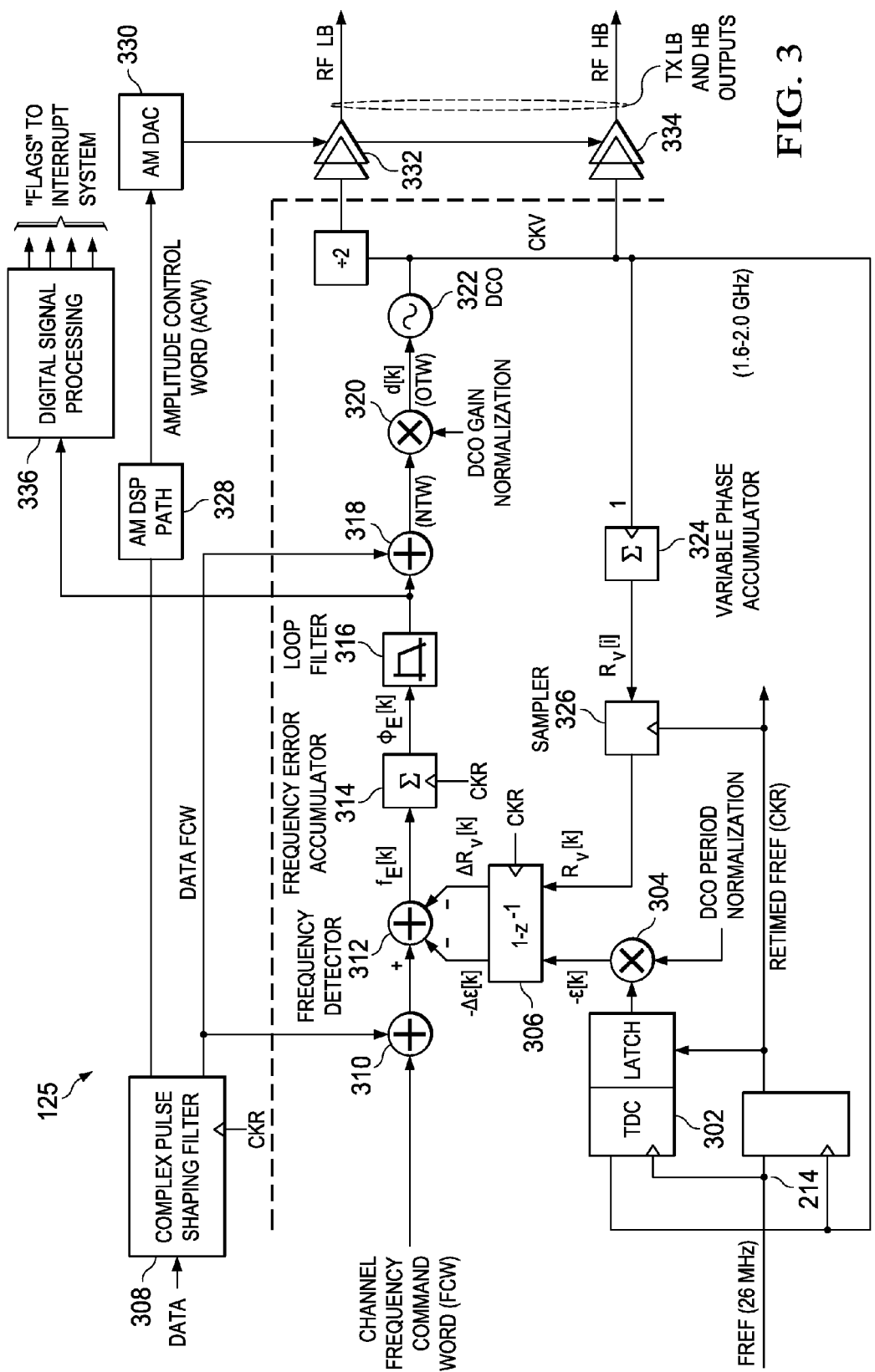
FIG. 3 is a block diagram of one embodiment of a phase-locked loop of the transceiver of FIG. 1.

A PLL 125 is coupled to the reference clock generator 120. The processor 155 is configured to adjust the phase (frequency) of the reference clock signal such that it remains synchronized to data received by the digital transceiver 100 and is therefore synchronized with other transceivers in the wireless network. Those skilled in the pertinent art refer to this synchronizing function, in which a received signal is decoded to yield a value that tells if the time base in the transceiver is faster or slower than the time base of the unit from which the signal was received, as an automatic frequency control loop. This prompts the processor 155 to adjust the frequency of the reference clock generator 120. The PLL 125 is locked to the reference clock to produce the local oscillator for the transmit chain 135 and the receive chain 130. FIG. 3, below, will illustrate one embodiment of the PLL 125.

Figure 4:
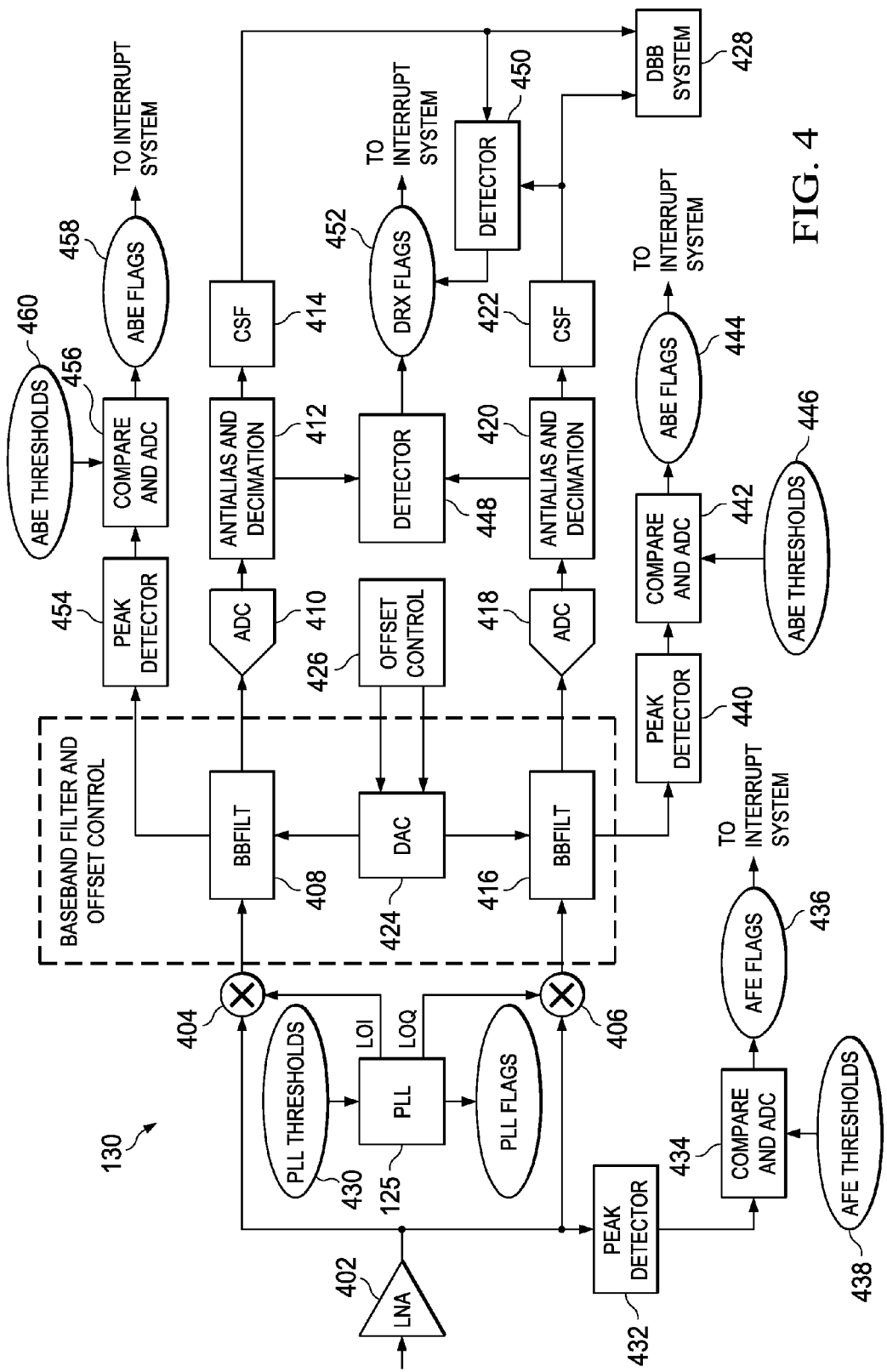
FIG. 4 is a block diagram of one embodiment of a receive chain of the transceiver of FIG. 1.

A receive chain 130 is coupled to the antenna 110 and the PLL 125. The receive chain 130 is configured to receive signals from the antenna 105 and produce one of the streams of digital data 110. FIG. 4, below, will illustrate one embodiment of the receive chain 130.

Figure 5:
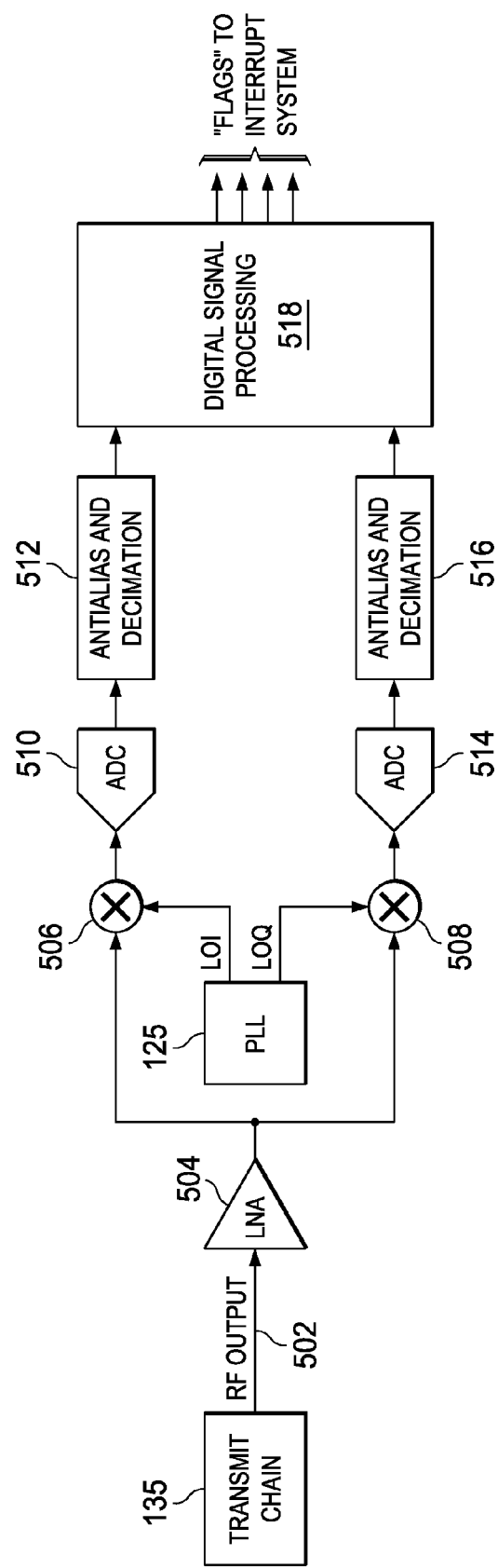
FIG. 5 is a block diagram of one embodiment of a transmit chain of the transceiver of FIG. 1.

A transmit chain 135 is also coupled to the antenna 110 and the PLL 125. The transmit chain 130 is configured to transmit signals via the antenna 105 based on one of the streams of digital data 110. FIG. 5, below, will illustrate one embodiment of the transmit chain 135.

Figure 6:
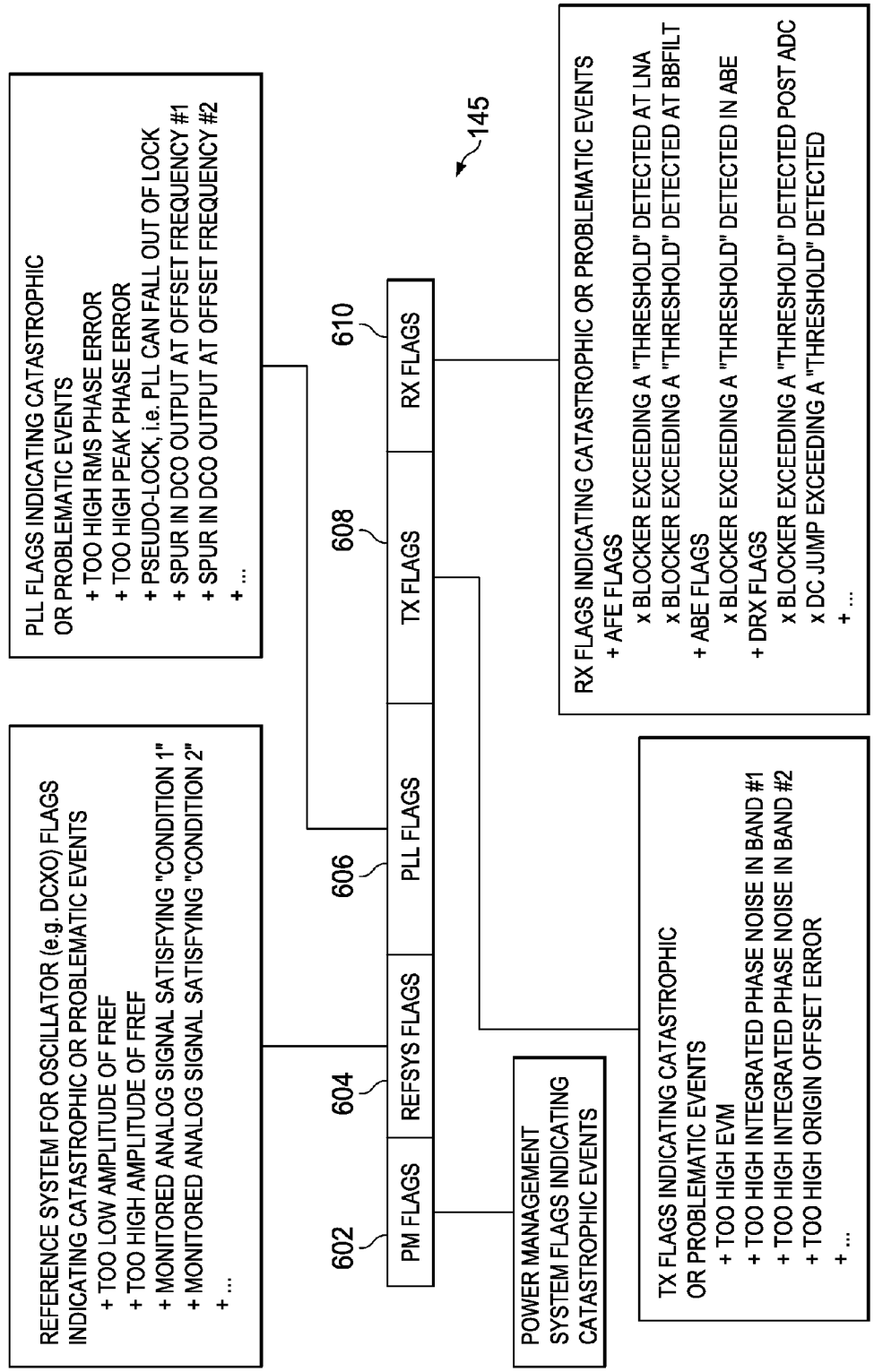
FIG. 6 is a block diagram of one embodiment of a flag register of the transceiver of FIG. 1.

Various control buses 140, shown in broken line, couple a flag register 145 to one or more of the power management system 115, the reference clock generator 120, the PLL 125, the receive chain 130 and the transmit chain 135. Further control buses (not shown) may couple the flag register 145 to other functional units of the digital transceiver 100 in various embodiments. The flag register 145 provides a repository for flags that may be set (e.g., toggled to "one") or reset (e.g., toggled to "zero") upon the occurrence or resolution of specific conditions in specific portions of the digital transceiver 100. The flag register 145 may group the flags according to location in the digital transceiver 100. For example, flags associated with the power management system 115 may be grouped together, and flags associated with the reference clock generator 120 may be grouped next to those. However, this need not be the case. FIG. 6, below, will illustrate one embodiment of the flag register 145.

An interrupt system 150 is associated with the flag register 145. The interrupt system 150 is configured to react to the setting and/or resetting of various flags in the flag register 145 perhaps based on various operating or other conditions prevailing in the digital transceiver 100. The interrupt system 150 typically reacts by issuing one or more interrupts. The interrupt system 150 may further mask flags or prioritize the issuance of interrupts based on a set of rules or conditions.

A processor 155 is coupled to the interrupt system 150. The processor 155 may be of any conventional or later-developed type whatsoever. Among other things, the processor 155 is configured to receive the interrupts issued by the interrupt system 150 and react to ("handle") them in an appropriate, often predetermined, way. Accordingly, the processor 155 is configured to execute software instructions that include interrupt handling routines. The processor 155 may further mask certain interrupts under certain conditions, assuming the interrupts are maskable, or prioritize its handling of interrupts based on a set of rules or conditions.

Upon the issuance of an interrupt, the processor 155 begins to execute one or more of the interrupt handling routines to handle the interrupts. Handling may involve the following actions: (1) reloading one or more identical parameters into transceiver hardware, (2) loading one or more different parameters into transceiver hardware or (3) issuing one or more warnings, e.g., to downstream elements of a larger system.

The first action presumes that one or more of the parameters originally loaded into the transceiver hardware have subsequently become corrupted and are causing aberrant operation. The second action presumes that one or more of the parameters need to be changed to accommodate a change in conditions in which the transceiver is now operating. The third action is particularly appropriate when the first two actions are ineffective or inadequate to handle a particular type, degree or extent of aberrant operation.

The first two actions may be carried out via various control buses 160 that couple the processor 155 to one or more of the power management system 115, the reference clock generator 120, the PLL 125, the receive chain 130 and the transmit chain 135. Further control buses (not shown) may couple the processor 155 to other functional units of the digital transceiver 100 in various embodiments. The third action may be carried out via a control bus 165 that couples the processor 155 to downstream elements of a larger system or in any other appropriate manner.

Having described an example of a transceiver and introduced some general embodiments of the invention, various functional units generally described in FIG. 1 will be presented in greater detail for the purpose of describing further, more particular, embodiments and uses of the invention.

The power management system 115 will not be illustrated, but those skilled in the pertinent art are aware of the structure and operation of a wide variety of power supplies and associated controllers that can form a power management system. Voltage and current sensors can be employed to generate flags based on conditions such as excessive or inadequate voltage, excessive or inadequate current, excessive voltage, excessive ripple on a switched frequency in the case of a switched mode supply or current fluctuation or any other characteristic of the power management system 115 that, if unsuitable, may cause aberrant operation.

FIG. 2 is a block diagram of one embodiment of the reference clock generator 120 of FIG. 1 showing various functional units therein. The reference clock generator 120 has an external quartz crystal 202 configured as a crystal oscillator together with the active elements shown in 120 to form a Colpitts oscillator. The oscillator generates a sinusoidal waveform of a certain frequency that forms the basis for generating a reference clock signal that forms the time base for the PLL 125. One leg of the crystal oscillator is connected to a varactor 204, which is controlled by a digital controller 206. The other leg of the crystal oscillator is connected to a varactor 208, which is controlled by a digital controller 210. The digital controllers 206, 210 control their respective varactors 204, 208 to control the frequency of the sinusoidal waveform. The bias current fed to the oscillator controls the amplitude of the output sinusoidal signal. The amplitude can be trimmed by controlling the bias current magnitude. An operational amplifier (FBUF) 212 converts the amplitude and frequency trimmed sinusoidal waveform to a square wave, which becomes the reference clock signal (FREF) and is provided at an output 214.

One embodiment of a detector circuit capable of initiating interrupts to indicate aberrant operation of the reference clock generator 120 includes a peak detector 216 configured to receive the trimmed sinusoidal waveform and generate a signal indicating its peak. The output of the peak detector can be connected to an ADC whose output is decoded to provide a digital signal that indicates whether the peak detector output is too high or too low. If it is too high, the oscillator stresses the external crystal and reduces its life. If it is too low, the oscillator may be about to stop oscillating, as the active circuit is not producing enough negative transconductance (gm) to sustain oscillation.

The same path can alternatively be used to monitor a different analog signal. The selector 218 is configured in this case to connect the analog signal to the ADC where it is now compared against predetermined thresholds in the digital decoding 226 block to produce appropriate signals. An example is an analog signal that indicates the temperature of the chip. If it is too high, a flag may be set. If too low, a different flag may be set.

The clock to the ADC is shown in FIG. 2 to be generated externally (f2) or internally by dividing the reference clock FREF 214 by 16 in the divider 220. The selector 222 can choose the external clock when the internal clock is not available, i.e., the reference system is powered down, however, the ADC is still monitoring an analog signal. The digital decoder 226 coupled to the output of the ADC 224 analyzes the ADC 224 output to generate flags to be conveyed to the flag register 145 of FIG. 1.

One flag may be set to indicate, for example, that the amplitude of the amplitude-trimmed sinusoidal waveform is too low. Another flag may be set to indicate, for example, that the amplitude is too high. Yet another flag may be set to indicate, e.g., excessive frequency drift or waveform distortion. Other reference analog or digital monitoring signals may be provided and compared to various signals internal to the reference clock generator 120 to detect the existence of a wide array of predetermined conditions indicating aberrant operation. The processor 155 of FIG. 1 may respond by providing replacement parameters to, for example, one or more of the digital controllers 206, 210 in an attempt to correct that aberrant operation.

FIG. 3 is a block diagram of one embodiment of the PLL 125 of FIG. 1 showing various functional units therein. The PLL 125 receives the reference clock signal FREF from the output 214 of the reference clock generator 120 of FIG. 1 into a time-to-digital converter (TDC) 302. The TDC 302 is normalized by a digitally controlled oscillator (DCO) period normalization factor in a scaling junction 304, the output of which is processed in a filter transform 306 to yield an error feedback signal. The PLL 125 also receives data to be transmitted into a complex pulse shaping filter 308 to yield, among other things, a data frequency command word (FCW). The data FCW is summed with a channel FCW in a summing junction 310 and summed again with the error feedback signal in a summing junction 312 of a frequency detector to yield a frequency error. A frequency error accumulator 314 integrates the error over time. The integrated error is provided to a loop filter 316. The output of the loop filter 316 is summed with the data FCW provided by the filter 308 in a summing junction 318 to yield a normalized tuning word (NTW) which, when normalized by a DCO gain normalization factor in a scaling junction 320, yields an oscillator tuning word (OTW) that is provided to a DCO 322. The output of the DCO 322 is a local clock signal (CKV) that is used to drive the TDC 302 and a variable phase accumulator 324, among other things. The variable phase accumulator 324 provides an input to a sampler 326 that is provided to the filter transform 306 and eventually results in the error feedback signal provided to the summing junction 312. The output of the filter 308 is further provided to an amplitude modulation (AM) digital signal processor (DSP) 328, which provides an amplitude control word (ACW). The ACW is converted to analog form in an AM digital-to-analog converter (DAC) 330. CKV is provided to a pair of low-band and high-band radio frequency modulators 332, 334 that modulate CKV based on the output of the AM DAC 330. The outputs of the low-band and high-band radio frequency modulators 328, 310 are provided to the transmit chain 135 of FIG. 1. Further details of the operation of the PLL can be found in "All-Digital PLL and Transmitter for Mobile Phones," Vol. 40, Issue 12 of IEEE Journal of Solid State Circuits, December 2005, pp. 2469-2482.

One embodiment of a detector circuit capable of initiating interrupts to indicate aberrant operation of the PLL 125 includes a DSP 336 coupled to the output of the loop filter 316. The DSP 336 analyzes the loop filter 316 output to generate flags to be conveyed to the flag register 145 of FIG. 1.

One flag may be set to indicate, for example, that the root-mean-square (RMS) phase error in the PLL 125 is too high. Another flag may be set to indicate, for example, that the peak phase error in the PLL 125 is too high. Yet another flag may be set to indicate, for example, pseudo-lock, i.e., that the PLL 125 has fallen out of lock. Still another flag may be set to indicate, for example, that a spur exists in the output of the DCO 322 at a first frequency offset. Still yet another flag may be set to indicate, for example, that a spur exists in the output of the DCO 322 at a second frequency offset. These flags may be set by extracting a suitable statistic from the real-time phase error, comparing it to a predetermined threshold and expressing the result as a one-bit value that indicates if a problem exists or not.

The processor 155 of FIG. 1 may respond by providing replacement parameters such as an FCW, a DCO period normalization factor, a DCO gain normalization factor or other parameters used in the various functional units in the PLL 125 in an attempt to correct its aberrant operation.

FIG. 4 is a block diagram of one embodiment of the receive chain 130 of FIG. 1 showing various functional units therein. The receive chain 130 is configured to receive signals from the antenna 105 of FIG. 1 into a LNA 402. The output of the LNA 402 is provided to in-phase and quadrature mixers 404, 406. The in-phase and quadrature mixers 404, 406 are coupled to the output of the PLL 125. The output of the in-phase mixer 404 is processed in a baseband (BB) filter 408, an ADC 410, an antialias and decimation filter 412 and a channel selection filter (CSF) 414. Likewise, the output of the quadrature mixer 406 is processed in a BB filter 416, an ADC 418, an antialias and decimation filter 420 and a CSF 422. A DAC 424 is coupled to the BB filters 408, 416 and controlled by an offset controller 426. A digital BB system 428 receives and further processes the output of the CSFs 414, 422.

As described in conjunction with FIG. 3, the PLL 125 receives one or more parameters that govern its operation. FIG. 4 shows these parameters as thresholds 430. These thresholds are written by the processor 155 to a memory (not shown) where they are compared to appropriate statistics extracted from the raw phase error or filtered phase error. The comparisons provide results that indicate if the PLL 125 is meeting the performance or has excessive phase error in a particular frequency or band, or is falling out of lock.

One embodiment of a detector circuit capable of initiating interrupts to indicate aberrant operation of the receive chain 130 includes a peak detector 432 coupled to the output of the LNA 402. A comparator and ADC 434 generate flags 436 to be conveyed to the flag register 145 of FIG. 1. The flags 436 may indicate, for example, the presence of a blocking signal at the output of the LNA 402 that exceeds a preset threshold. The processor 155 of FIG. 1 may respond by providing different parameters to the LNA 402 or different thresholds 438 to the comparator and ADC 434.

Another embodiment of a detector circuit capable of initiating interrupts to indicate aberrant operation of the receive chain 130 includes a peak detector 440 coupled to the output of the quadrature BB filter 416. A comparator and ADC 442 generate flags 444 to be conveyed to the flag register 145 of FIG. 1. The flags 444 may indicate, for example, the presence of a blocking signal that has a quadrature component exceeding a BB filter threshold. The processor 155 of FIG. 1 may respond by providing different parameters to the quadrature BB filter 416 or different thresholds 446 to the comparator and ADC 442.

Yet another embodiment of a detector circuit capable of initiating interrupts to indicate aberrant operation of the receive chain 130 includes a detector 448 coupled to the outputs of the in-phase and quadrature antialias and decimation filters 412, 420 and a further detector 450 coupled to the outputs of the in-phase and quadrature CSFs 414, 422. The detectors 448, 450 generate flags 452 to be conveyed to the flag register 145 of FIG. 1. The flags 452 may indicate, for example, the presence of a blocking signal that exceeds a post-ADC threshold. The processor 155 of FIG. 1 may respond by providing different parameters to the antialias and decimation filters 412, 420 or the CSFs 414, 422.

Still another embodiment of a detector circuit capable of initiating interrupts to indicate aberrant operation of the receive chain 130 includes a peak detector 454 coupled to the output of the in-phase BB filter 408. A comparator and ADC 456 generate flags 458 to be conveyed to the flag register 145 of FIG. 1. The flags 458 may indicate, for example, the presence of a blocking signal that has an in-phase component exceeding a BB filter threshold. The processor 155 of FIG. 1 may respond by providing different parameters to the in-phase BB filter 408 or different thresholds 460 to the comparator and ADC 456.

Other reference analog or digital monitoring signals may be provided and compared to various signals internal to the receive chain 130 to detect the existence of a wide array of predetermined conditions indicating aberrant operation, such as an inappropriate gain in an automatic gain control (AGC).

An important factor distinguishing the detectors 432, 440, 448, 450 of the illustrated embodiment is that the signal undergoes more filtering as it propagates through the receive chain 130. The signal also undergoes more gain as it propagates through analog stages in the receive chain 130. The output of the LNA 402 is broadband, and the peak detector 432 detects if the broadband output exceeds a preset threshold. However, the peak detector 440 detects the frequency components that survive the BB filter 416. The surviving energy does not contain high frequency components, and the peak detector 440 detects the peak of the surviving energy. Hence if the peak detector 432 reports a high peak while the peak detector 440 does not, it implies that a far-out frequency is compressing the LNA (this frequency is eliminated at the BB filter 416 output). In a similar fashion, the detector 450 reports the peak of the in-band signal, i.e., the signal of interest. Therefore, the combined output of these detectors 432, 440, 448, 450 can be processed to evaluate whether or not a large blocking signal is compressing a particular filter in the receive chain 130. If all detectors report high signals, it means that the signal of interest has very high amplitude (since it does not see any filtering in the chain and turns on each detector).

FIG. 5 is a block diagram of one embodiment of the transmit chain 135 of FIG. 1 showing various functional units therein. The transmit chain 135 itself is not shown in detail, because its operation usually determines conditions, rather than responds to them. One embodiment of a detector circuit capable of initiating interrupts to indicate aberrant operation of the transmit chain 135 feeds back the output of the transmit chain 135 and therefore takes the form of a simplified receive chain. The receive chain includes a pickup 502 that inductively couples an LNA 504 the output of the transmit chain 135. The output of the LNA 504 is provided to in-phase and quadrature mixers 506, 508. The in-phase and quadrature mixers 506, 508 are coupled to the output of the PLL 125 of FIG. 1. The output of the in-phase mixer 506 is processed in an ADC 510 and an antialias and decimation filter 512. Likewise, the output of the quadrature mixer 508 is processed in an ADC 514 and an antialias and decimation filter 516. A DSP 520 generates flags to be conveyed to the flag register 145 of FIG. 1. The flags may indicate, for example, an excessive error vector magnitude (EVM), an integrated phase noise that is too high in one or more bands or an origin offset error that is too high. The processor 155 of FIG. 1 may respond by providing different parameters to the transmit chain 135 to compensate for these various causes of aberrant operation.

FIG. 6 is a block diagram of one embodiment of the flag register 145 of FIG. 1 showing various functional units therein. As described above, the flag register 145 provides a repository for flags that may be set (e.g., toggled to "one") or reset (e.g., toggled to "zero") upon the occurrence or resolution of specific conditions in specific portions of the digital transceiver 100. The flag register 145 of FIG. 6 groups the flags according to location in the digital transceiver 100. For example, flags associated with the power management system 115 are grouped together in a PM group 602, flags associated with the reference clock generator 120 are grouped together in a REFSYS group 604, flags associated with the PLL 125 are grouped together in a PLL group 606, flags associated with the transmit chain 135 are grouped together in a TX group 608 and flags associated with the receive chain 130 are grouped together in an RX group 610. Flags may also exist for environmental conditions that are not related to one particular functional unit of the transceiver hardware, such as temperature, shock or pressure. Corresponding sensors associated with the transceiver may detect and set flags indicating unsuitable levels of these.

Figure 7:
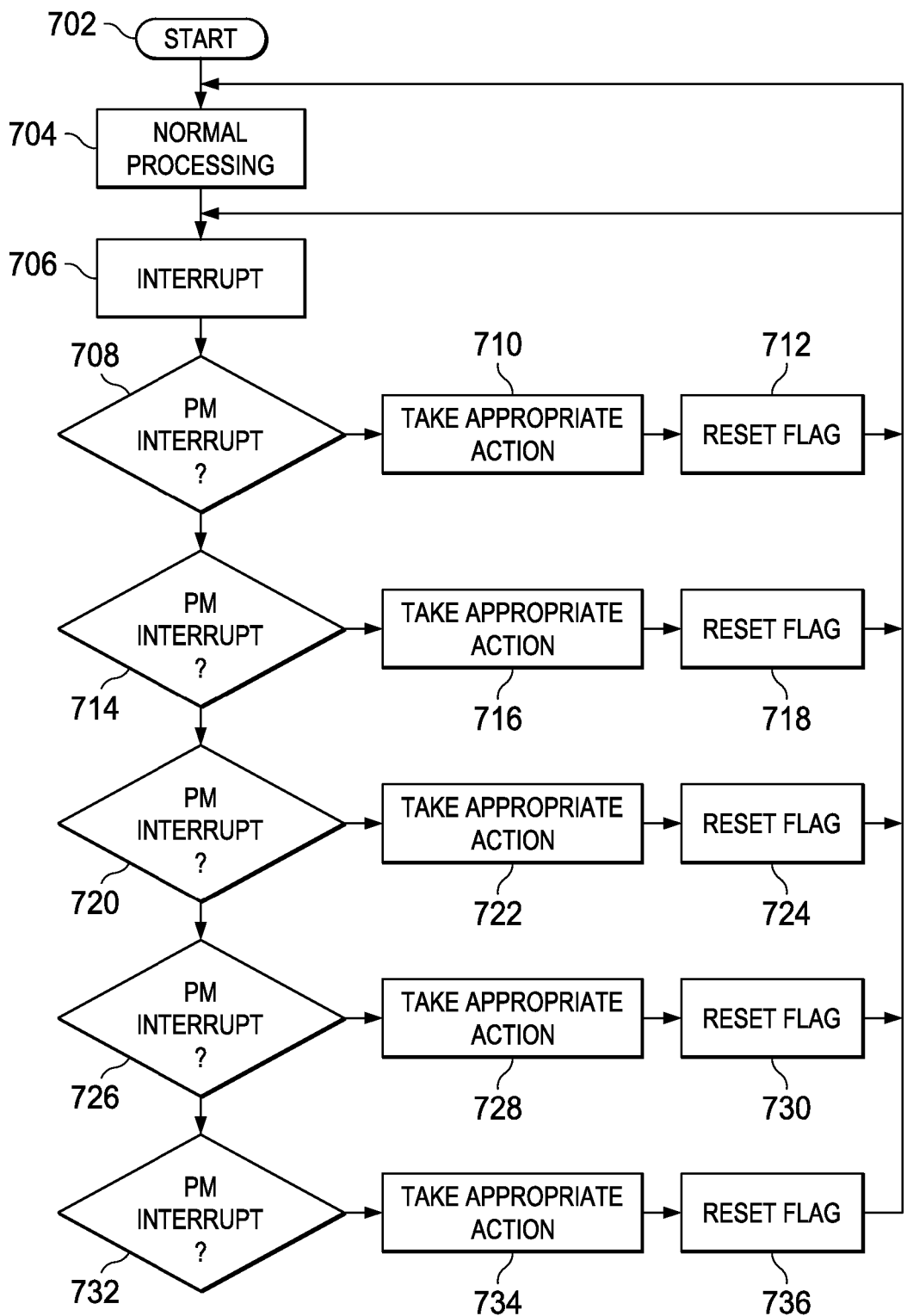
FIG. 7 is a flow diagram of one embodiment of a method of controlling aberrant transceiver operation.

FIG. 7 is a flow diagram of one embodiment of a method of controlling aberrant transceiver operation that the processor 155 of FIG. 1 may carry out. The processor initializes the transceiver in a start step 702. In a step 704, the processor operates normally; the transceiver hardware is not displaying any aberrant operation. In a step 706, the interrupt system issues an interrupt, indicating the onset of aberrant operation.

In a decisional step 708, the processor determines the interrupt to be received in response to a condition that set a PM flag. In a step 710, the processor takes appropriate action to handle the interrupt, such as reloading a previously loaded parameter, loading a different parameter or issuing a warning.

In a step 712, the interrupt system resets the PM flag indicating resolution of the condition. In a decisional step 714, the processor determines the interrupt to be received in response to a condition that set a REFSYS flag. In a step 716, the processor takes appropriate action to handle the interrupt. In a step 718, the interrupt system resets the REFSYS flag indicating resolution of the condition. In a decisional step 720, the processor determines the interrupt to be received in response to a condition that set a PLL flag. In a step 722, the processor takes appropriate action to handle the interrupt, such as readjusting or reprogramming the PLL. In a step 724, the interrupt system resets the PLL flag indicating resolution of the condition. In a decisional step 726, the processor determines the interrupt to be received in response to a condition that set an RX flag. In a step 728, the processor takes appropriate action to handle the interrupt, such as readjusting or reprogramming the receive chain. In a step 730, the interrupt system resets the RX flag indicating resolution of the condition. In a decisional step 732, the processor determines the interrupt to be received in response to a condition that set a TX flag. In a step 734, the processor takes appropriate action to handle the interrupt, such as readjusting or reprogramming the transmit chain. In a step 736, the interrupt system resets the TX flag indicating resolution of the condition. Having handled the interrupt, the processor returns to the normal processing of the step 704.

Those skilled in the art to which the invention relates will appreciate that other and further additions, deletions, substitutions and modifications may be made to the described embodiments without departing from the scope of the invention.

What is claimed is:

1. A transceiver, comprising:
   a processor;
   an interrupt system coupled to said processor and having a flag register associated therewith;
   detection circuits associated with corresponding functional units of said transceiver and configured to detect conditions regarding said corresponding functional units and set corresponding flags in said flag register, said interrupt system configured to assert interrupts in response thereto; and
   an interrupt handing routine executable in said processor and configured to respond to said interrupts by carrying out at least one of loading parameters and generating warnings based on identities of said flags.

2. The transceiver as recited in claim 1 wherein said transceiver includes a reference clock generator, a phase-locked loop, a receive chain and a transmit chain and said detection circuits are associated with functional units of all of said reference clock generator, said phase-locked loop, said receive chain and said transmit chain.

3. The transceiver as recited in claim 1 wherein at least one of said detection circuits compares an output of a corresponding functional unit to a threshold and sets a corresponding flag when said output exceeds said threshold.

4. The transceiver as recited in claim 1 wherein at least one of said detection circuits includes one selected from the group consisting of:
   an analog-to-digital converter, and
   a digital signal processor.

5. The transceiver as recited in claim 1 wherein said transceiver further includes a power management system and at least one of said detection circuits is associated with functional units of said power management system.

6. The transceiver as recited in claim 1 wherein said transceiver is a digital transceiver.

7. The transceiver, comprising
a processor;
an interrupt system coupled to said processor and having a flag register associated therewith;
detection circuits associated with corresponding functional unit of said transceiver and configured to detect conditions regarding said corresponding functional units and set corresponding flags in said flag register, said interrupt system configured to assert interrupts in response thereto; and
an interrupt handling routine executable in said processor and configured to respond of said interrupts by carrying out at least one of loading parameters and generating warnings based on identities of said flags, wherein said interrupt-handling routine is configured to compare multiple of said corresponding flags to determine a presence of a blocking signal.

8. A method of controlling aberrant transceiver operation, comprising:
detecting a condition regarding a functional unit of said transceiver with a detection circuit;
setting a corresponding flag in a flag register with said detection circuit;
asserting an interrupt in response to said setting; and
responding to said interrupts by carrying out at least one of loading parameters and generating warnings based on identities of said flags.

9. The method as recited in claim 8 wherein said transceiver includes a reference clock generator, a phase-locked loop, a receive chain and a transmit chain and said method further comprises carrying out said detecting, said setting, said asserting and said responding with respect to functional units of all of said reference clock generator, said phase-locked loop, said receive chain and said transmit chain.

10. The method as recited in claim 8 wherein said detecting comprises comparing an output of a corresponding functional unit to a threshold and said setting comprises setting a corresponding flag when said output exceeds said threshold.

11. The method as recited in claim 8 wherein at least one of said detection circuits includes one selected from the group consisting of:
an analog-to-digital converter, and
a digital signal processor.

12. The method as recited in claim 8 wherein said transceiver further includes a power management system and said method further comprises carrying out said detecting, said setting, said asserting and said responding with respect to functional units of said power management system.

13. The method as recited in claim 8 wherein said transceiver is a digital transceiver.

14. The method of controlling aberrant transceiver operation, comprising:
detecting a condition regarding a functional unit of said transceiver with a detection circuit;
setting a corresponding flag in a flag register with said detection circuit;
asserting an interrupt in response to said setting;
responding to said interrupts by carrying out at least one of loading parameters and generating warnings based on identities of said flags; and
comparing multiple of said corresponding flags to determine a presence of blocking signal.

15. A digital transceiver, comprising:
a reference clock generator;
a phase-locked loop coupled to said reference clock generator;
a receive chain coupled to said phase-locked loop;
a transmit chain coupled to said phase-locked loop;
a processor;
an interrupt system coupled to said processor and having a flag register associated therewith;
detection circuits associated with corresponding functional units of said reference clock generator, said phase-locked loop, said receive chain and said transmit chain and configured to detect conditions regarding said corresponding functional units and set corresponding flags in said flag register, said interrupt system configured to assert interrupts in response thereto; and
an interrupt handling routine executable in said processor and configured to respond to said interrupts by carrying out at least one of loading parameters in said corresponding functional units and generating warnings based on identities of said flags.

16. The digital transceiver as recited in claim 15 wherein at least one of said detection circuits compares an output of a corresponding functional unit to a threshold and sets a corresponding flag when said output exceeds said threshold.

17. The digital transceiver as recited in claim 15 wherein at least one of said detection circuits includes one selected from the group consisting of:
an analog-to-digital converter, and
a digital signal processor.

18. The digital transceiver as recited in claim 15 further comprising a power management system, at least one of said detection circuits being associated with functional units of said power management system.

19. The digital transceiver, comprising:
a reference clock generator;
a phase-locked loop coupled to said reference clock generator;
a receive chain coupled to said phase-locked loop;
a transmit chain coupled to said phase-locked loop;
a transmit chain coupled to said phase-locked loop;
a processor;
an interrupt system coupled to said processor and having a flag register associated therewith;
detection circuits associated with corresponding functional units of said reference clock generator, said phase-locked loop, said receive chain and said transmit chain and configured to detect conditions regarding said corresponding functional units and set corresponding flags in said flag register, said interrupt system configured to assert interrupts in response thereto; and
an interrupt handling routine executable in said processor and configured to respond to said interrupts by carrying out at least one of loading parameters in said corresponding functional units and generating warnings based on identities of said flags,
wherein said interrupt-handling routine is configured to compare multiple of said corresponding flags to determine a presence of a blocking signal.

20. A digital transceiver comprising:
a reference clock generator;
a phase-locked loop coupled to said reference clock generator;
a receive chain coupled to said phase-locked loop;
a transmit chain coupled to said phase-locked loop;
a processor;
an interrupt system coupled to said processor and having a flag register associated therewith;
detection circuits associated with corresponding functional units of said reference clock generator, said phase-locked loop, said receive chain and said transmit chain and configured to detect conditions regarding said corresponding functional units and set corresponding flags in said flag register, said interrupt system configured to assert interrupts in response thereto wherein:

one of said detection circuits is configured to compare phase error to a defined threshold to detect said phase-locked loop falling out of lock;

one of said detection circuits is configured to compares energy at an offset frequency in a phase error signal to a threshold to detect a presence of an undesired spur at an output of said phase-locked loop;

one of said detection circuits is configured to compare a peak output of a low-noise amplifier to a threshold may detect compression of a front-end of said receive chain;

one of said detection circuits is configured to compare an analog-to-digital converter output to a threshold to detect compression of a back-end of said receive chain; and an interrupt handling routine executable in said processor and configured to respond to said interrupts by carrying out at least one of loading parameters in said corresponding functional units and generating warnings based on identities of said flags.

* * * * *